(No Model.)
F. ECKSTEIN.
COMPOSITION OF MATTER FOR USE AS A SUBSTITUTE FOR GLASS, &c.
No. 458,157. Patented Aug. 25, 1891.
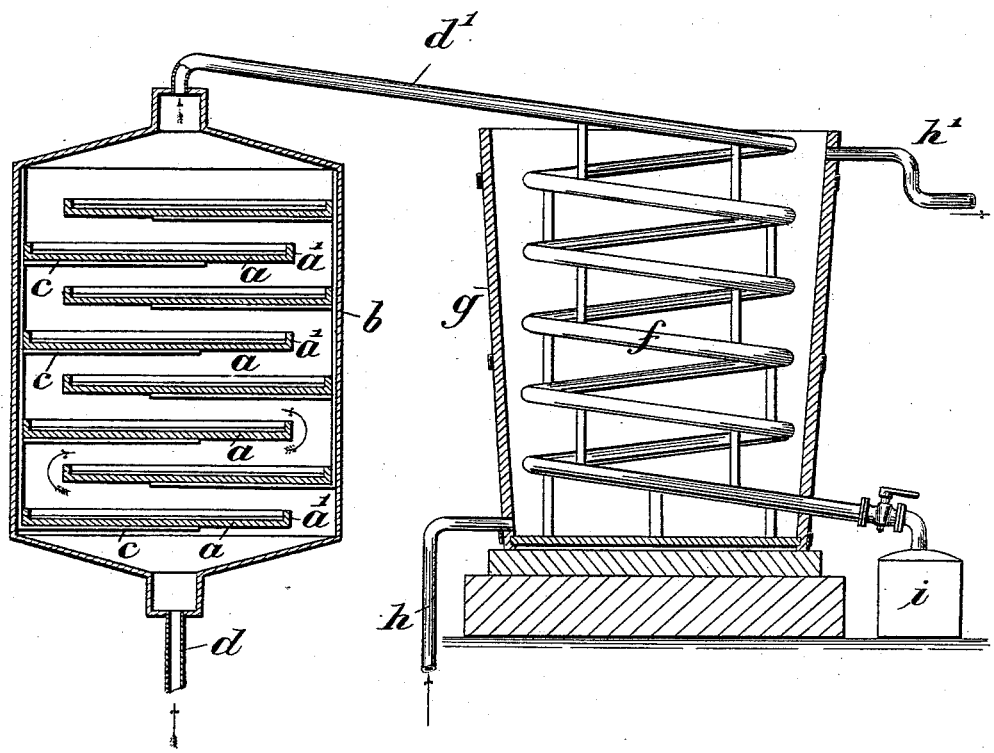
Witnesses:
H. J. Dieterich
B. W. Sommers
Inventor:
Friedrich Eckstein
By his Attorney:

UNITED STATES PATENT OFFICE.

FRIEDRICH ECKSTEIN, OF VIENNA, AUSTRIA-HUNGARY.

COMPOSITION OF MATTER FOR USE AS A SUBSTITUTE FOR GLASS, &c.

SPECIFICATION forming part of Letters Patent No. 458,157, dated August 25, 1891.

Application filed April 8, 1891. Serial No. 388,078. (No specimens.)

*To all whom it may concern:*

Be it known that I, FRIEDRICH ECKSTEIN, chemist, a subject of the Emperor of Austria, residing at Vienna, in the Province of Lower Austria, in the Empire of Austria-Hungary, have invented certain new and useful Improvements in a Composition of Matter for Use as a Substitute for Glass, &c.; and I do hereby declare the following to be a full, clear, and exact description of the invention, such as will enable others skilled in the art to which it appertains to make and use the same.

The invention has for its object the production of a substance adapted for use as a substitute for glass for various purposes; and it consists in a new composition of matter, as will now be fully described.

Various attempts have heretofore been made to produce a substance having the properties of glass without its brittleness or fragility, and being more or less pliable or elastic. These attempts have, however, not been attended with any great measure of success, for the reason that the chemical composition of the substitute was liable to alteration or decomposition under various conditions of use. This is more especially the case when celluloid or pure collodion have been used, either *per se* or as principal ingredients of the substitute, which, in the latter case lacked transparency, while celluloid is very expensive and not sufficiently flexible or pliable and has the disadvantage of the odor of camphor. On the other hand, after drying the celluloid sheets lose their transparency to a great extent and become more or less brittle, especially when of a thickness of about one millimeter or more. As to the collodion, it is extremely difficult to prevent it from curling up in drying, and has a tendency to become horny and translucent, and this can be obviated only by the use of expensive solvents, such as acetic acid amyl ether or formic acid amyl ether, and even with these solvents the difficulty referred to is only partially overcome.

The new composition of matter which forms the subject-matter of this invention is perfectly transparent, very hard, yet very ductile, so that it can be rolled into sheets or plates of any desired thickness, it can be produced at a comparatively small cost, and has none of the disadvantages of the celluloid and collodion substitutes heretofore proposed. The new composition of matter is therefore well adapted as a substitute for glass for many purposes, both in the arts, as well as for household purposes, and is an excellent material for photographers' plates, as it will readily receive and retain a sensitizing film.

In the production of the new substitute for glass I dissolve from four (4) to eight (8) parts of collodion-wool in about one hundred (100) parts, by weight, of ether or alcohol or acetic ether, and with this I intimately combine from two (2) to four (4) per centum of castor-oil or other non-resinous oil and four (4) to ten (10) per centum of resin or Canada balsam or other balsam (soft resin.) The compound, when poured upon a glass plate and subjected to the drying action of a current of air of about 50° centigrade, solidifies in a comparatively short time into a transparent glass-like sheet or plate, the thickness of which may be regulated as required. The sheet or plate so obtained has substantially the same properties as glass, as it will resist the action of salts and alkalies and of dilute acids, and like glass is transparent and has no smell. On the other hand it has the advantage of being pliable or flexible and infrangible to a great degree, while its inflammability is much less than that of the collodion substitutes.

The solvent may readily be recovered and condensed for further use; and to this end I have shown a convenient apparatus in the accompanying sheet of drawings, in which said apparatus is shown in vertical axial section, the condenser being shown in elevation.

In the drawing, $b$ indicates a vessel adapted to be hermetically closed and having the air-inlet pipe $d$ at bottom, the outlet-pipe $d'$ at top connected with or forming part of a condenser-worm $f$, contained in a refrigerator $g$, of which $h'$ is the inlet-pipe for the refrigerant liquid, and $h$ the exhaust-pipe. As shown, the condenser-worm has a valved discharge, with which the receiver $i$ for the condensed solvent is connected.

In the vessel $b$ are arranged shelves that extend alternately from one wall of the vessel toward the opposite wall for the reception of the glass molds $a$, that have an edge flange $a'$ that determines the thickness of the plates or sheets to be cast. These molds $a$, when placed upon the shelves $c$, extend from wall to wall of the vessel $b$ in one direction and project beyond their shelves in an opposite direction from one wall of the vessel $b$ to near the opposite wall thereof, so as to form a zig-zag passage for the heated air entering at $d$, thence passing under the lower mold around the right-hand end thereof under the next succeeding mold and around the left-hand end of the latter under the mold next above the same, and so on alternately from right to left and left to right, the solvent being evaporated and condensed as it passes through the condenser.

The compound, after exposure to an air-current of a temperature of about 50° centigrade, as above stated, for some time, first becomes opalescent, then hardens and becomes horny and perfectly transparent, after which the molds are taken out of the drier and the sheets or plates removed, when they are ready for use.

The compound, as will be readily comprehended, is of such a nature that any desired color or shade of color may be imparted to it by the admixture of the necessary pigment. The pigments should be soluble in the solvent used in the preparation of the compound if incorporated therewith; but the color may be imparted to the substance by surface application, aniline dyes or colors being employed, so that the sheets or plates may be used in lieu of stained glass. The material may also be ornamented by printing any desired design thereon.

If magnesium chloride or grape-sugar is combined with the material, the inflammability thereof is very materially reduced, while an addition of zinc-white or heavy spar imparts to it the appearance of ivory, so as to adapt it for use in the manufacture of collars, cuffs, shirt-fronts, and the like.

By suitably increasing the relative proportions of castor-oil and resin a material having substantially the toughness and pliability or flexibility of leather is obtained, and such material may be fashioned into driving and other belting. The composition of matter is, however, adapted for use in many other ways— as, for instance, for table and other ware, in lieu of glass, as a substitute for celluloid, for emulsion-plates, for surgical and measuring instruments, and for many other purposes.

Having thus described my invention, what I claim as new therein, and desire to secure by Letters Patent, is—

1. The herein-described composition of matter, consisting of collodion-wool, a non-resinous oil, as castor-oil, and a balsam or soft resin, for the purpose set forth.

2. The herein-described composition of matter, consisting of collodion-wool, a non-resinous oil, as castor-oil, a balsam or soft resin, and a pigment, for the purpose set forth.

3. The herein-described composition of matter, consisting of collodion-wool, a non-resinous oil, as castor-oil, a balsam or soft resin, and magnesium chloride or the like, for the purpose set forth.

In testimony whereof I affix my signature in presence of two witnesses.

FRIEDRICH ECKSTEIN.

Witnesses:
W. B. MURPHY,
A. SCHLESSING.